Feb. 24, 1931.                H. W. KLINGER                1,793,807
                                VISCOSIMETER
                              Filed July 30, 1927

WITNESS:

INVENTOR
Harry W. Klinger
BY
ATTORNEYS.

Patented Feb. 24, 1931

1,793,807

UNITED STATES PATENT OFFICE

HARRY W. KLINGER, OF WILMINGTON, DELAWARE, ASSIGNOR TO HERCULES POWDER COMPANY, OF WILMINGTON, DELAWARE, A CORPORATION OF DELAWARE

VISCOSIMETER

Application filed July 30, 1927. Serial No. 209,552.

My invention relates to an improvement in viscosimeters such as are used for testing or determining the viscosity of liquids.

Heretofore the usual form of viscosimeter has comprised a tube closed at one end and provided with a pair of spaced markings. A sample of liquid, the viscosity of which is to be determined, is placed in the tube, sufficient of the liquid being used to fill the tube over the upper mark which is usually placed adjacent the upper end of the tube. A ball, as, for example, a ball having substantially less diameter than the bore of the tube is then dropped into the tube and the time required for it to pass from the upper to the lower mark, with the tube in vertical position, is taken and gives the viscosity, or rate of flow, of the liquid.

Viscosimeters of the character indicated have proved entirely satisfactory for determining the viscosity of a clear liquid or solution, but are of no value where it is desired to determine the viscosity of an opaque liquid or solution since the ball cannot be observed in its passage through the liquid or solution.

Now it is the object of my invention to provide a device for determining the viscosity of opaque liquids or solutions such as colored varnishes, lacquers and the like.

Having now indicated, in a general way, the nature and purpose of my invention, I will proceed to a detailed description of a preferred embodiment thereof with reference to the accompanying drawing in which:—

Figure 1:
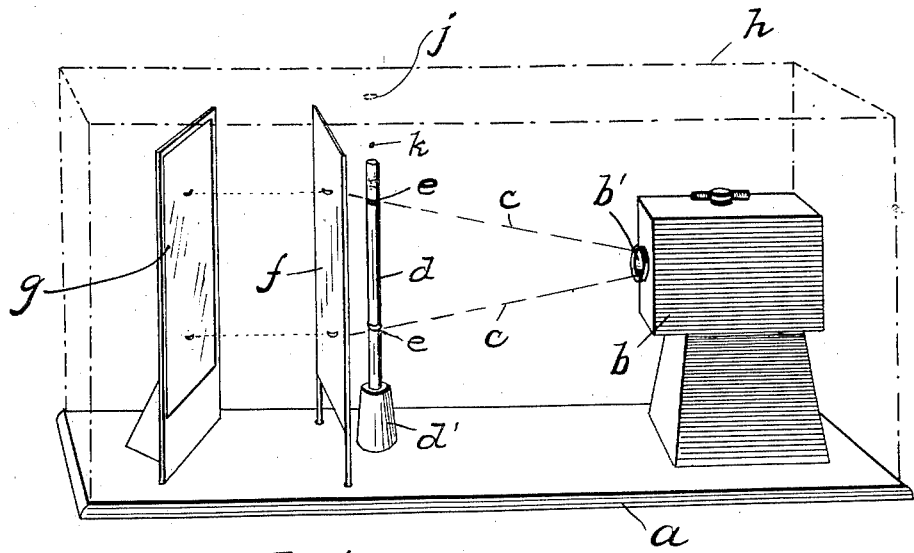
Fig. 1 is a perspective view of a device embodying my invention, with the casing removed.

In the drawing $a$ indicates a base upon which is mounted a source of X-rays as an X-ray machine $b$ of any usual or desired structure and so arranged as to project X-rays from the aperture $b'$. Spaced from the X-ray machine and in the path of the rays therefrom, indicated by lines $c$, is positioned a viscosimeter tube $d$. The viscosimeter tube $d$ is mounted on a stand $d'$ and is provided with spaced markings formed by rings of lead $e$ which will not be injured or penetrated by the X-rays.

Spaced behind the viscosimeter tube and across the path of the X-rays is positioned a florescent screen $f$ and spaced behind the florescent screen is positioned a mirror $g$, which extends at an angle to the plane of extension of the florescent screen.

A casing of lead $h$ indicated by broken lines, Fig. 1, is adapted to be secured to the base $a$ and to enclose the X-ray machine, viscosimeter tube, screen and mirror in order to confine the X-rays and prevent damage, or injury to the operator therefrom.

Figure 2:
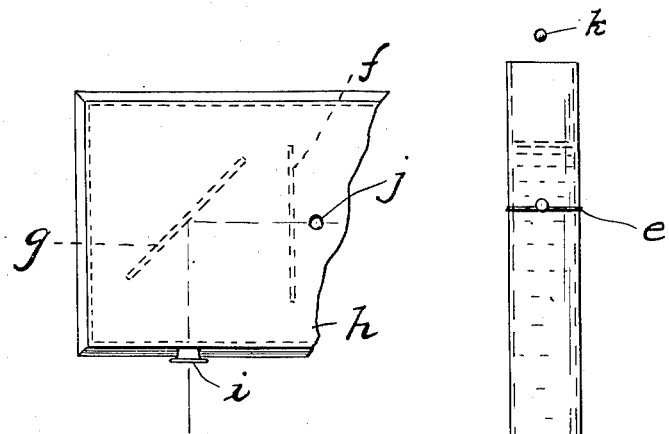
Fig. 2 is a fragmentary plan view of a device embodying my invention.
Figure 3:
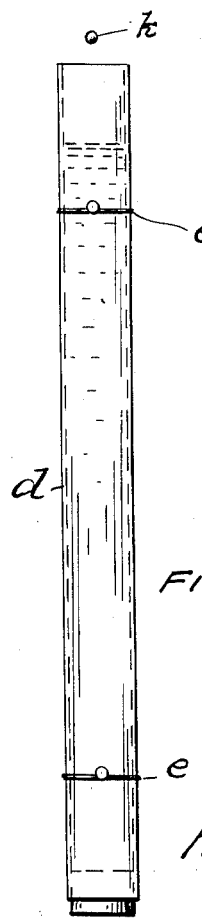
Fig. 3 is an elevation of a viscosimeter tube incorporated in the device embodying my invention.

In the side of the casing adjacent to the mirror there is provided a sight hole $i$ through which the face of the mirror may be observed and a hole $j$ is provided in the top of the casing above the viscosimeter tube $d$ to enable the ball $k$, which is desirably made with steel or other metal, to be dropped into the tube, as will be understood from an inspection of Figure 2.

In determining the viscosity of an opaque liquid or solution the viscosimeter tube $d$ is filled with the liquid or solution and the X-ray machine turned on. When the X-ray machine is turned on the X-rays will pass through the viscosimeter tube and the liquid or solution therein and through the florescent screen, which will cause a shadow of the lead rings to be thrown on the mirror $g$, which may be observed through the sight hole $i$. The ball $k$ is then dropped, through the hole $j$ in the casing, into the tube $d$ and it descends by gravity through the liquid or solution therein. As the ball drops in the tube its shadow is thrown on the mirror $g$ and the time required for it to pass the space between the lead rings $e$ and hence the viscosity may be readily noted by an observer through the sight hole $i$.

It will be understood that while the device embodying my invention is more particularly adapted for use in determining the viscosity of opaque liquids or solutions, it may be used with equal effect in determining the viscosity of clear liquids or solutions.

Having now fully described my invention, what I claim and desire to protect by Letters Patent is:—

1. A viscosimeter comprising in combination a source of X-rays, a florescent screen, a viscosimeter tube provided with spaced markings impenetrable by X-rays positioned between the source of X-rays and the florescent screen and means adapted to reflect a shadow from said screen.

2. A viscosimeter comprising in combination a source of X-rays, a florescent screen, a viscosimeter tube provided with markings impenetrable by X-rays positioned between the source of X-rays and the florescent screen and a mirror positioned to reflect a shadow from said florescent screen of the markings on the viscosimeter tube and of a ball passing through said tube.

3. A viscosimeter comprising in combination a source of X-rays, a florescent screen, a viscosimeter tube provided with markings impenetrable by X-rays positioned between the source of X-rays and the florescent screen and a mirror positioned at an angle to the plane of said screen and adapted to reflect a shadow from said florescent screen of the markings on the viscosimeter tube and of a ball passing through said tube.

4. A viscosimeter comprising in combination a source of X-rays, a florescent screen, a viscosimeter tube provided with markings impenetrable by X-rays positioned between the source of X-rays and the florescent screen, a mirror positioned at an angle to the plane of said screen and adapted to reflect a shadow from said florescent screen of the markings on the viscosimeter tube and of a ball passing through said tube and a casing impenetrable by X-rays about said element, said casing being provided with a sight hole adjacent said mirror.

In testimony of which invention, I have hereunto set my hand, at Wilmington, Delaware, on this 27th day of July, 1927.

HARRY W. KLINGER.